US006764601B1

(12) United States Patent
Levy et al.

(10) Patent No.: US 6,764,601 B1
(45) Date of Patent: Jul. 20, 2004

(54) METHOD FOR GRANULATING POWDERS

(75) Inventors: Ehud Levy, Roswell, GA (US); Matthew D. Barranco, Cumming, GA (US); Mohammed Tazi, Alpharetta, GA (US)

(73) Assignee: Selecto Scientific, Inc., Suwanee, GA (US)

( * ) Notice: Subject to any disclaimer, the term of this patent is extended or adjusted under 35 U.S.C. 154(b) by 0 days.

(21) Appl. No.: 09/835,452

(22) Filed: Apr. 16, 2001

(51) Int. Cl.[7] ............................................... C02F 1/42
(52) U.S. Cl. .................. 210/660; 210/688; 210/691; 502/64; 502/415; 502/516; 502/518; 95/95; 95/274
(58) Field of Search ................................ 210/660, 688, 210/641, 263; 502/64, 415, 518, 516; 95/274, 95

(56) References Cited

U.S. PATENT DOCUMENTS

| | | | | |
|---|---|---|---|---|
| 4,147,624 A | * | 4/1979 | Modell | 210/673 |
| 4,238,334 A | | 12/1980 | Halbfoster | 210/679 |
| 4,263,266 A | | 4/1981 | Michel et al. | 423/329 |
| 4,299,613 A | * | 11/1981 | Cardarelli | 71/64.11 |
| 4,377,555 A | | 3/1983 | Hancock et al. | 252/430 |
| 4,496,528 A | | 1/1985 | Bourgogne et al. | 423/328 |
| 4,767,733 A | | 8/1988 | Chester et al. | 502/65 |
| 4,891,949 A | | 1/1990 | Caldarola | 62/3.2 |
| 4,965,320 A | * | 10/1990 | Overbergh | 525/207 |
| 4,994,249 A | | 2/1991 | Verduijn | 423/328 |
| 4,995,975 A | | 2/1991 | Jacquot et al. | 210/266 |
| 5,073,272 A | | 12/1991 | O'Neil | 210/728 |
| 5,078,978 A | | 1/1992 | Talbet et al. | 210/912 |
| 5,118,655 A | | 6/1992 | Pedersen | 502/412 |
| 5,133,871 A | | 7/1992 | Levy | 210/688 |
| 5,137,975 A | * | 8/1992 | Kelusky | 525/263 |
| 5,175,110 A | | 12/1992 | Bradshaw et al. | 210/662 |
| 5,236,680 A | | 8/1993 | Nakazawa et al. | 423/328.1 |
| 5,238,676 A | | 8/1993 | Roth et al. | 423/713 |
| 5,346,924 A | | 9/1994 | Giuffrida | 521/28 |
| 5,401,416 A | | 3/1995 | Levy | 210/668 |
| 5,460,734 A | | 10/1995 | Birbara et al. | 210/763 |
| 5,503,840 A | | 4/1996 | Jacobson et al. | 424/421 |
| 5,538,746 A | | 7/1996 | Levy | 426/477 |
| 5,552,058 A | | 9/1996 | Fanning | 210/669 |
| 5,562,941 A | | 10/1996 | Levy | 426/433 |
| 5,587,089 A | | 12/1996 | Vogel et al. | 210/164 |
| 5,612,522 A | | 3/1997 | Levy | 204/157.4 |
| 5,616,243 A | | 4/1997 | Levy | 210/282 |
| 5,639,822 A | * | 6/1997 | Hungenberg | |
| 5,645,727 A | | 7/1997 | Bhave et al. | 210/651 |
| 5,655,212 A | | 8/1997 | Sekhar et al. | 428/552 |
| 5,681,475 A | | 10/1997 | Lamensdorf et al. | 210/660 |
| 5,737,932 A | | 4/1998 | Lee | 62/135 |
| 5,879,565 A | | 3/1999 | Kusmierz et al. | 210/757 |
| 5,915,815 A | | 6/1999 | Wattricket al. | 4/619 |
| 5,961,843 A | | 10/1999 | Hayakawa et al. | 210/748 |
| 6,039,891 A | | 3/2000 | Kaufman et al. | 252/79.1 |
| 6,127,512 A | * | 10/2000 | Asrar et al. | 528/272 |
| 6,200,677 B1 | * | 3/2001 | Richardson et al. | 428/343 |
| 6,200,743 B1 | | 3/2001 | Cutteret al. | 210/685 |
| 6,225,421 B1 | * | 5/2001 | Promel et al. | 526/65 |
| 6,241,893 B1 | | 6/2001 | Levy | 210/660 |
| 6,258,876 B1 | * | 7/2001 | Medoff et al. | 524/13 |
| 6,270,609 B1 | * | 8/2001 | Markell et al. | |
| RE37,597 E | * | 3/2002 | Rajagopalan et al. | 473/385 |
| 6,476,137 B1 | * | 11/2002 | Longo | 525/191 |
| 2001/0042719 A1 | * | 11/2001 | Levy | |
| 2002/0053119 A1 | * | 5/2002 | Provost et al. | 24/452 |
| 2003/0032702 A1 | * | 2/2003 | Medoff et al. | |

FOREIGN PATENT DOCUMENTS

| | | | | |
|---|---|---|---|---|
| EP | 0 515 936 A1 | 12/1992 | | B01D/71/02 |
| WO | 96/06814 | 3/1996 | | C04B/36/65 |

OTHER PUBLICATIONS

Polyolefins–Melt Flow Index (for HDPE)–www.knovel. com accessed Sep. 30, 2002.*
U.S. patent application Ser. No. 09/772,542, Levy, filed Jan. 2001.*
Perry's Handbook of Chemical Engineering, 5th Ed., 1973, at p. 8–64 (right side), McGraw–Hill Book Co.*
Krupp Werner & Pfeiderer Corporation, Ramsey, NJ, Product Brochure: "Productivity first, ZSK Mc Twin–screw MEGAcompounders,"publication 05 170/1–4.0–IX.99 LMP.Wü, not dated.
Krupp Werner & Pfleiderer Corporation, Ramsey, NJ, Product Brochure: "Economy counts, MEGAcompounders ZSK 25, 40 and 50 with innovative advantages," publication 05 164/1–5.0–VI.99 LMP ./St., not dated.
Feltag, "High Density Polyethylene," http://www.ashchem.com/comm./GeneralPoly/cycle/2000/June.asp.
Gil, "Cork–current and new materials," http://bioproducts–bioenergy.gob/pdfs/ocota/abstracts/26/72.pdf.
"Polypropylen Ralfia Grade," http://www.sends.ch.pdf/plastic/862–020.pdf.

* cited by examiner

Primary Examiner—Chester T. Barry
(74) Attorney, Agent, or Firm—Bruce D. Gray; Kilpatrick Stockton LLP

(57) ABSTRACT

The invention relates to a process of coating inorganic particles with organic compositions, and agglomerating, compacting and heating of the coated particles into granules. Coating and compacting the agglomeration may be conducted continuously, and may be used to form granules having sizes ranging from about 1 to about 200 mesh. In one embodiment, these particles can be used to purify drinking water by removing heavy metals such as arsenic, lead and mercury and to remove or kill microorganisms in the drinking water, air and gas.

15 Claims, No Drawings

METHOD FOR GRANULATING POWDERS

BACKGROUND OF THE INVENTION

1. Field of the Invention

The invention relates processes for forming granulates from powders and/or particles, especially inorganic powders and/or particles, and organic polymers. The process can be operated continuously, and the resulting granulates are suitable for a variety of uses, particularly in purification of fluids, and even more particularly in the filtration of water and air.

2. Description of Related Art

In many areas of technology, it is often desirable to contact fluids with solid materials in order to separate materials in the fluid. For example, in the area of water purification, it is often desirable to separate undesirable volatile organic compounds (VOC), microorganisms, heavy metals, and other species from the water by contacting the water containing these contaminants with a solid material capable of absorbing or adsorbing them from the water. However, many of these solid materials, while capable of absorbing or adsorbing contaminants, are undesirable for use in purification applications because they can, over time, leach or otherwise deposit material into the fluid being purified.

This is particularly problematic when the adsorbing or absorbing material is a fine particulate (a characteristic that is very desirable from the standpoint of adsorption or absorption efficiency, since the smaller the particle, the more surface area is available for adsorption or absorption). Deposition of small particulates into the fluid can be particularity detrimental, since these particulates may contain relatively large amounts of the contaminant desired to be removed in the first place.

Additionally, the adsorbing or absorbing materials may themselves be considered to be contaminant in the fluid if they become entrained therein. This can occur by a variety of mechanisms, such as erosion of the adsorbing or absorbing material by contact with the fluid, or by the presence of small particles of adsorbing or absorbing material that can be present when the material is fire contacted with the fluid (i.e., dusting).

A number of different techniques have been developed in attempts to provide good separation efficiency while reducing contamination of the fluid by the separation medium. These include forming the separation material into porous blocks of particles held together with some form of binder resin. However, doing so sacrifices much of the advantages of high surface area that lead to the use of particulates in the first place. In addition, melting and extruding some HDPE binders into relatively large blocks makes uniform heating difficult, requiring the use of relatively high temperatures to provide adequate heat transfer to melt the binder material near the center of the block. This, in turn, may lead to hot spots in the material, in particular as the size of the block increases. The development of hot spots thus limits the size of the blocks that may be produced.

Another technique includes packing particles of the separation medium into canisters designed to allow fluid to flow in and out and to contact the separation medium, but to retain the particles within the coaster. The need to prevent escape of the particles from the canister places an effective lower limit on the size of the particles that can be used, and therefore of the surface area that can be obtained, and typically is not able to prevent introduction of some particulates into the fluid as the result of dusting of the separation medium.

Accordingly, there remains a need in the art for a material that can serve as a fluid separation medium, that contains fine particulates to provide good contact between the fluid and the separation medium, and that provides little or no leaching and/or dusting of the separation medium.

SUMMARY OF THE INVENTION

This invention satisfies these needs. It relates to a process for forming granules (and to the granules formed by the process) containing inorganic particles agglomerated with a binder containing a polymeric material, typically a high-density polyethylene (HDPE). The granules typically have sizes in the range from about 1 mesh to about 200 mesh.

The granules are formed by gradual heating of binder particles to a temperature below the melting point of the binder, but sufficiently above room temperature to soften the binder particles. The binder particles are combined with the inorganic particles and the two particles are mixed. This combination and mixing can occur prior to, during, or after heating of the binder particles, or some combination thereof. For example, in one embodiment of the invention, the binder particles are slowly preheated to a temperature below their melting temperature, and then combined and mixed with the inorganic particles, optionally with additional heat wherein the shear stress of mixing and/or additional heating is desirably sufficient to further soften and tackify the binder. In another embodiment of the invention, binder particles at ambient temperature are mixed and compacted with the inorganic particles, and the resulting mixture is heated to soften and tackify the binder particles.

The softened binder and the inorganic particles are then cooled. The result of this cooling may be used as the desired granules, or may be in the form of flakes or chips, that can be ground to form the desired granules of an appropriate size. Grinding of compressed material may also occur prior to heating, but after mixing and compaction of the binder and inorganic particles.

Without wishing to be bound by any theory, it is believed that during the initial heating the binder particles soften and become tact. At least a portion of the tacky surfaces of the softened binder particles comes into contact with the inorganic particles during mixing, and the inorganic particles adhere to the surfaces of the binder particles. During mixing and/or heating, at least some of the binder particles become further softened. Combined with optional applied compression, this draws the inorganic particles together and causes them to adhere to each other. The result is an agglomeration of the inorganic particles into granules, along with possibly the formation of binder particles having inorganic particles on their surface.

In embodiments of the invention where the binder particles are not preheated, it is believed that a first agglomeration of the inorganic particles with the binder particles occurs as the result of pressure compaction. The resulting agglomerates may be ground prior to heating, or may be heated without grinding, or may be ground after heating. The grinding is generally to a particle size of about 28 to about 48 mesh. In any case, the material is heated after compacting in an over to slowly raise the temperature of the material to below the melting point of the binder resin. Again, it is believed that the heating step renders the binder particles soft, tacky, and flowable, increasing adhesion to the inorganic particles.

A number of different methods exist for optionally preheating, and for combining and heating the HDPE binder and the inorganic particles that will form the desired granules, and these methods are within the scope of the present invention. These methods have in common the mixing of inorganic particles with the binder particles, and the subsequent heating and/or compression of the mixture to soften the binder and force the particles and the binder together, and the subsequent cooling of the heated material to form the desired agglomerated granules. The precise mechanisms and equipment used to carry out these processes may differ to some extent, but processes that carry out these steps are within the scope of the invention.

One suitable method for making the granules involves heating and mixing the binder and the inorganic particles in a twin screw compounder, which can be co-rotating or counter-rotating. In this embodiment, it is generally desirable to preheat the binder particles to a temperature sufficiently above ambient to render their surfaces tacky, but below the melting temperature. The binder can be heated by the application of external heat to make it tacky, and the inorganic particles added and combined with the tacky binder particles by the mixing action of the twin screws. Additional heating of the mixture may be provided by shear stress (as in an extruder) or by the application of external heating, or both. This additional heating raises the temperature of the binder sufficiently to cause further softening. The twin screws also desirably compact the mixture of inorganic particles and binder, which is believed to force the inorganic particles together into an agglomerate. The binder is allowed to cool and harden to form the desired granules.

Another suitable method involves heating a fluidized bed of binder, such as HDPE, to a temperature of about 180° F. to about 600° F., which softens and tackifies the surfaces of the binder particles, and adding inorganic particles, optionally in a different zone of the bed, further heating the mixture to further soften the binder, and cooling to form the desired granules Another suitable method involves mixing of the binder polymer particles, such as HDPE, and inorganic particles in a mixer, such as a ribbon mixer with high speed shearing, and then compacting the mixture in a continuous compactor to a particle size of about 1 to about 200 mesh. The compacted is then heated from about 30 minutes to about 3 hours at temperatures ranging from about 350° to about 600° F. The timing of the heating depends on the size of the particle and the amount of the compacting powder in the oven. At a temperature of 350° F. to 500° F., about 2000 lb of material can be heated for about 6 to about 8 hours.

In another embodiment of he invention, the process is used to agglomerate inorganic particles, such as zirconia or other metal oxide, onto a base or core particle of alumina or carbon, using the polymer particles as a binder. A similar process is followed, involving mixing of the base or core particle with the preheated binder particles, adding the inorganic coating particle, and heat the mixture to soften and at least partially liquefy the binder material, so that it becomes flowable and binds the inorganic coating particles to the base or core particle.

The granules obtained by these processes provide an excellent material for use wherever the inorganic particles can be used, e.g., in fluid purification or gas applications, and where dusting of the granules is undesirable. The granules provide exceptional surface area, because of the small size of the inorganic particles incorporated into them but do not exhibit the breaking characteristics typically encountered with particles in their size range.

DETAILED DESCRIPTION OF SPECIFIC EMBODIMENTS

The description below relates to specific embodiments of the invention. Those of skill in the art will recognize that other, alternative embodiments will exist and that these do not depart from the spirit and scope of the invention.

In general, and as described above, the invention relates to methods of granulating inorganic particles with a polymeric binder material. Typically, the granules have a particle size ranging from about 200 mesh to about 1 mesh, more particularly from about 20 mesh to about 80 mesh. In more particular embodiments, the granules may have an average diameter ranging from about 10 microns to about 1000 microns, more particularly from about 10 microns to about 400 microns.

The inorganic particles themselves generally have an average diameter ranging from 20 nm to about 200 microns more particularly from about 0.1 micron to 50 microns. The size of the inorganic particles used is to some extent influenced by the desired size of the granules, with larger inorganic particles generally resulting in larger granules. Any inorganic particle that will function to absorb or adsorb contaminants present in a fluid stream, or that will provide antimicrobial activity can be used. As an example, for applications involving water purification, the inorganic particles generally comprise a metal oxide, such as zirconia, copper oxide, silver oxide, alumina oxide, or titania. These may generally be from about 20 nm to about 100 microns in size.

In general, the particles may have a narrow particle size distribution, but wide distributions or bimodal distributions may also be used. In a particular embodiment, at least some of the inorganic particles are used in the form of nanocrystals, i.e., they may have a particle size ranging from about 20 nm to about 200 nm more particularly from about 20 nm to about 100 nm. These nanocrystalline particles can be prepared by techniques known in the art as "fuming". The fuming process generally involves at least three steps. In the first step, plasma energy is applied to a material, such as a metal, which vaporizes as the result of contact with the plasma, and forms a "fume." In the second step, the "fume" is quenched with a reactive gas, possibly oxidized, and begins to condense. In the third step, the metal oxide vapor is further cooled to form small, generally spherical, nanocrystalline particles.

These nanocrystalline particles have been found to be particularly suitable for use with low or zero mewing index HDPE and have been found to be very adherent thereto. The granules formed according to the invention using zero melting index HDPE and nanocrystalline inorganic particles exhibit little or no dusting. Suitable inorganic particles include carbon, silver oxide, titania, alumina, zinc oxide, or zeolite, which can also be present in nanocrystalline form. Mixtures of two or more inorganic particles can be used, such as titania with zinc oxide, alumina with titania, and copper with titania.

In general, any suitable polymeric material can be used as the binder. It has been found, however, that HDPE is particularly suitable for combination with the inorganic particles described above for preparation of granules suitable for use in fluid purification applications, such as the purification of water, petroleum products, air, and the like. Because a significant application of the granules prepared by the invention is in the area of water purification, it is generally desirable to select polymers that will not degrade when in contact with water and air, and that are very wettable. Low-density polyethylene (LDPE) can also be used, but is generally not as efficient as HDPE. LDPE should have an ASTM D1238 melt flow index of around g/10 min.

More particularly, HDPE having an extremely low or zero melting index has been found to be particularly suitable for use as a binder in preparing granules suitable for use in purification of water and air. Zero melting index HDPE has been found to be especially suitable, since it changes shape and becomes flowable only very slowly, and thus does not obstruct the pores and the change of inorganic materials. Generally, the binder is used in the form of particles having an average diameter ranging from about 5 microns to about 200 microns. Such a binder can be heated for a substantial period of time at a temperature below its melting point without any appreciable decomposition. This allows the binder to emerge from any heating(preheating with surfaces that have become tacky and in softened form, without decomposition. The binder particles thus retain a relatively uniform size and shape throughout the preheating process. This is particularly desirable, since the heating/preheating will typically occur over a substantial period of time.

In general, when preheating is used, it involves heating the binder material to a temperature that is about 350° F. to about 6000° F., but in any case below its melting point, for a period of time ranging from about 60 min/kg of resin to about 90 min/kg of resin, assuming a zero melting index HDPE binder resin. Regardless of the specific resin used, the preheating step involves heating the binder material to a temperature above room temperature and below its melting point for a time period sufficient to cause the surfaces of the binder particles to become tacky. Those sin lied in the art will recognize that this preheating can be done in the presence of the inorganic particles if necessary, and this is done in one embodiment of the invention. In other embodiments, it is sufficient to preheat only the binder particles, and this has the advantage of a lower heat duty for the process. In other embodiments, such as those using a compactor, preheating may be unnecessary.

In general, once the binder particles have been sufficiently heated to tender their surfaces tacky, and have been mixed with the inorganic particles in such a way as to provide intimate contact between the polymer particles and the inorganic particles, the two are compressed to provide more intimate contact between the inorganic particles. Various devices may be used to accomplish this mixing, such as static mixers, compounders, kneaders, Banbury-type mixers, pressure compactors, and the like. The mixture is subjected to sufficient heating, typically supplied by a heat source applied to the mixing equipment, to cause the binder to soften. The mixture is typically heated to a temperature ranging from about 350° F. to about 600° F., more particularly from about 450° F. to about 600° F., or a time period ranging from about 10 min/kg to about 60 min/kg mixture. As the binder softens and becomes more flowable, the inorganic particles adhering to the surface of the polymer particle tend to move together, forming an agglomerate of inorganic particles held or adhered together by the binder material. This can be assisted by compressing the material during heating e g, by conducting mixing and heating simultaneously, or by using a separate compression step that occurs during, prior to, or after, heating. The inorganic particles can be added in ratios ranging from about 1 wt % metal oxide to about 85 wt % metal oxide, based upon the total weight of inorganic particles and polymer particles.

Once the agglomerates are heated to above the softening temperature of the binder, they are cooled to form granules. The resulting granules can be ground into smaller granules, or can be used as they are obtained from the process.

In one particular type of process, the granules can be formed using a twin screw compounder. The order of addition of particles is not particularly critical, and can be varied or reversed. A suitable specific embodiment of this type of process is described herein. In this specific embodiment HDPE particles are first introduced into a first stage of compounder and very gradually heated to 350° F. to 600° F. For example, in the first stage of the compounder, the temperature is around 300° F. and over 4½ feet of screw length is gradually increased to a temperature under 600° F. The screws of the compounder are primarily designed to accept the particles of HDPE as feed, and move them at an appropriate rate (e.g., around 350 lb/hr) down the barrel of the compounder. As the particles move down the compounder barrel, they are heated until they reach an average temperature of around 500° F. By this point, the particles have softened and their surfaces have become tacky.

In the next stage of this embodiment, particles comprising a metal, e.g. a metal oxide, such as zirconia, copper oxide, silver oxide, aluminum oxide, or zeolite, nanocristalline metal oxides (such as nanocrystalline zinc oxide, nanocristalline titania, nanocrystalline copper oxide, etc.), or silver, or carbon, or mixtures thereof are added. The nanocrystalline metal oxide particles generally have particle sizes rang between about 20 nm and about 200 microns. The mixture of metal oxide particles and polymeric particles is heated to about 450° F. In this second stage, at least some of the metal oxide particles form a coating on the polymeric particles. As the mixture leaves the second stae,g it is cooled to form granular, approximately spherically shaped material, at least a portion of the metal oxide particles coating the approximately spherically shaped polymer granules.

The shape of the screws of the twin screw compounder may vary from stage to stage to create different shear conditions at different temperatures. For example, in the embodiment of the invention wherein the polymer particles are added to the compounder first the compounder screws in the first zone may be shaped so as to slowly move the particles through the preheating stage, thereby allowing a very gradual increase in the temperate of the particles to the targeted temperate range. The compounder screws in the first stage, in effect, act as screw pumps or conveyors to move the polymer particles through the heating zone at a controlled rate, and allowing for sufficient residence fine to tackify the surface of the particles and begin to soften them. Typically, the compounder screws are designed to move the particles through the preheating zone at a rate of about 1 kg/min/° F. The screws may be designed so that some or all of the heating is provided by shear stress on the particles as they are pumped through the zone, or so that only minimal heating is supplied by shear stress and the majority (or almost all) of the heating is supplied by an external healer, such as healing bands or collars.

Once the polymer particles have been moved through the preheating zone and their surfaces tackified, they can be mixed with inorganic particles in the second stage of the compounder. The second stage screws may be shaped to provide intimate mixing of the tackified polymer particles and the inorganic particles. For example, the screws in this stage may contain kneading disks, mixing pins or pegs, Maddock mixing heads, or other structures to increase the level of mixing of the tackified polymer particles and the inorganic particles. Alternatively, the materials may be forced through a static mixer in line with the compounder barrels. The mixture of polymer particles and inorganic particles is then compressed by, e.g., closely spaced or narrow screw channels for compression of the mixture. This compression can occur substantially simultaneously with mixing, or may occur after mixing is substantially complete. The mixed material is also heated to a temperature sufficient to further soften the polymer binder, which heating can occur prior to, during, and/or after compression of the mixture. The combination of heating and compression is believed to force the inorganic particles closer together displacing the softened binder, and forming an agglomeration of inorganic particles held together by the softened binder polymer.

In the last stage of the compounding process, the material is cooled and the final product leaves the cooling station. Cooling can be accomplished by conventional techniques, such as forced air or jackets or collars that bring cooling fluid into contact with the compounder barrels Desirably, the zero-melting index HDPE is cooled to a temperature ranging from about 100° F. to about 70° F. The cooled agglomerates are then removed from the compounder. The material can be forced through dies ranging in size from about 1 mm to about 50 mm.

One example of a suitable compounder for use in making the agglomerates of the invention is the ZSK MEGA compounder produced by Krupp Werner Pfleiderer. The rotary screws of the compounder have a sealing profile that avoids zones with poor material flow and ensures a consistent formation of granules and self-cleaning of the process equipment.

Similar compounding equipment can be used to coat metal oxide particles on a core particle of zeolite, alumina, carbon or other material. In this arrangement the core particles, which generally have a particle size of 2–100 mesh with a surface pH ranging from about 2—to about 10, are fed to the compounder in a first stage, without preheating, and the binder particles are fed into the compounder in a second stage, where they are contacted with the core particles and the mixture is heated sufficiently to render the binder particles soft and flowable. The inorganic particles are then added, and form a coating on the larger core particles.

As indicated above, the compounder can also be used without preheating of the binder particles, for example, where the binder particles and the inorganic particles are mixed and subjected to shear stress heating and/or external heating in the compounder, and this heating is sufficient to tackify and soften the binder particles.

Another method for preparing the granules of the invention involves introducing the particles into a heated fluidized bed. The bed may be heated by heating the fluidizing gas, which flows through the bed, fluidizing the particles. The binder particles become soft and tacky, as described above, and the inorganic particles adhere to their surfaces when introduced into the bed. The mixture can then be further heated and pressurized if necessary in order to compress the particles together. Granules can then be obtained at the end of the fluidizing process.

Another method of producing the granules of the invention involves introducing the binder and inorganic particles into a compactor and compressing them with a pressure ranging from about 60—to about 5000 psi, and optionally ground to a desired size particle of about 1 mesh to about 200 mesh. The compacted or compacted/ground material is further heated for 60 min to 4 hours at an average temperature of about 350° F. to about 600° F. and then cooled to an ambient temperature. The percentage of the binder in the mix ranges from about 10% to about 70%. The compacted material can incorporate between about 30 and about 80% of inorganic particles in the form of nanocrystals of approximately 20 nm to 100 micron diameter, which are integrated to the polymer during the heating process.

In one embodiment, the compactor is a pressure compactor, e.g., a roll press or granulating mill. Desirably, the compactor contains two mechanical wheels or rollers that counterrotate, and have a rip or gap bets them. The binder particles and inorganic particles are introduced between the wheels or rollers, and the movement of the wheels or rollers draws the particles into the rip or gap, where they are compressed to form sheets or flakes of solid material by the time the particles exit the gap. These sheets or flakes can be heated directly, as described above, and then ground to the desired granule size (about 1 to about 200 mesh), or ran be first ground to the desired granule size, and then heated as described above. Those of skill in the art will recognize that other compaction techniques can be used, such as those described in standard engineering handbooks.

The granules prepared by the invention have a number of uses, particularly in the preparation of filtration materials for purifying fluids, such as water and air. For example, granules of zirconia coating alumina core particles as described above have been found to be particularly suitable in filtration devices to remove arsenic from drinking water where the zirconia coating acts as the adsorbent. The particles can be packed into small filters or large columns without appreciable dusting. The unique structure of the coating and their ingredients allow a regeneration process of 5% sodium hydroxide to regenerate the zirconia surface without any damage to the shape and the pores of the formation.

Another formulation that has been found to have very effective antimicrobiological properties is a granule zinc oxide, nanocrystalline to oxide, copper oxide and silver oxide in amounts ranging from about 0.01 wt % to about 60 wt %, based on the weight of the granule. This material provides a surface that inhibits or prevents the growth of microorganisms, such as bacteria and mold. The time in which the material exhibits effectiveness for bacteria control can vary from a few minutes to a few hours. The sizing and the proportion of such compositions in part depends on the volume of water and the contact time. The smaller the particle size attached to the binder the better the kinetic and the surface attraction of the metal oxide to microorganisms. The unique surface activity demonstrates microorganism reduction with amounts of granules as low as 1% by weight. These reductions can be as high as 99% in the first hour and 99.99% after 24 hours. The proportion of the silver oxide, copper oxide zinc oxide and nanocrystalline titania may vary from application to application.

EXAMPLES FOR WATER PURIFICATION

The following proportions of binder and inorganic particles have been found to be particularly useful in fluid purification when prepared by the techniques described above.

1. 20% binder, 40% carbon, and 40% zinc oxide.
2. 20% binder, 40% zinc oxide, 20% copper oxide, 10% alumina
3. 40% binder, 60% nanocrystalline titania
4. 30% binder, 70% zinc oxide
5. 20% binder, 40% zeolite, 40% zinc oxide
6. 20% binder, 60% carbon, 20% zinc wade
7. 10% binder, 40% carbon, 10% zinc oxide, 10% copper, 10% silver, 20% zeolite. For example, in applications involving purification of drinking water, the amount of silver used will be rather low (probably the lowest of the inorganic materials in the coating), because silver has been regulated for such use. In these applications, the amount of nanocrystalline titania or nanocrystalline zinc can be increased up to 75%.

What is claimed is:

1. A granulated powder purification material comprising:

inorganic particles having an average size ranging from about 20 nm to about 200 microns in an amount ranging from about 1 wt % to about 75 wt % agglomerated with a zero melting index high-density polyethylene binder.

2. The granulated powder purification material of claim 1, further comprising core particles having an average particle size ranging from about 2 mesh to about 200 mesh agglomerated with the inorganic particles and binder.

3. The granulated powder purification material of claim 3, wherein the core particles comprise alumina, zeolite, carbon, or mixtures thereof.

4. The granulated powder purification material of claim 1, wherein the inorganic particles comprise zirconia.

5. The granulated powder purification material of claim 3, wherein the core particles comprise alumina and the inorganic particles comprise zirconia.

6. The granulated powder purification material of claim 3, wherein the alumina is gamma alumina or alpha alumina.

7. A method for reducing the level of contaminants in a fluid, comprising contacting the fluid with granulating powder purification material of claim 1, thereby producing a reduced contaminant fluid.

8. The method of claim 7, wherein the contaminants comprise microbiological organisms, volatile organic compounds (VOC), heavy metals, or mixtures thereof.

9. The method of claim 8, wherein the microbiological organisms comprise bacteria.

10. The method of claim 8, wherein the fluid is air.

11. The method of claim 8, wherein the fluid is a compressed gas.

12. The method of claim 11, wherein the compressed gas is $CO_2$.

13. The method of claim 8, wherein the fluid is water.

14. The method of claim 13, wherein the fluid is wastewater.

15. The method of claim 13, wherein the reduced contaminant fluid is potable water.

* * * * *